United States Patent

Esmaeili et al.

Patent Number: 5,961,865
Date of Patent: Oct. 5, 1999

[54] SHIELDED WELDING DEVICE FOR OPTICAL FIBERS

[75] Inventors: Sasan Esmaeili, Solna; Håkan Ekwall, Tyresö; Torsten Lund, Järfälla; Dan Tillberg, Stockholm, all of Sweden

[73] Assignee: Telefonaktiebolaget LM Ericsson, Stockholm, Sweden

[21] Appl. No.: 09/083,185

[22] Filed: May 22, 1998

[30] Foreign Application Priority Data

May 23, 1997 [SE] Sweden .................................. 9701954

[51] Int. Cl.⁶ .............................. H05B 7/18; G02B 6/255
[52] U.S. Cl. ............................................. 219/383; 385/96
[58] Field of Search ................................. 219/383, 385, 219/388; 385/95, 96, 97, 98

[56] References Cited

U.S. PATENT DOCUMENTS

| | | |
|---|---|---|
| 4,548,630 | 10/1985 | Biedka . |
| 4,914,797 | 4/1990 | Tsuchida et al. . |
| 5,046,813 | 9/1991 | Itoh et al. . |
| 5,384,878 | 1/1995 | Osaka et al. ................. 385/96 |
| 5,524,163 | 6/1996 | Kobayashi et al. ............ 385/96 |
| 5,745,311 | 4/1998 | Fukuoka et al. .............. 359/896 |

FOREIGN PATENT DOCUMENTS

| | | |
|---|---|---|
| 494809 | 7/1992 | European Pat. Off. . |
| 0 720 032 | 7/1996 | European Pat. Off. . |
| 3019425 | 11/1980 | Germany . |
| 3245229 | 6/1984 | Germany . |
| 4123227 | 7/1992 | Germany . |
| 59-38718 | 3/1984 | Japan . |
| 2 052 786 | 1/1981 | United Kingdom . |
| 93/00720 | 1/1993 | WIPO . |
| 96/27811 | 9/1996 | WIPO . |

OTHER PUBLICATIONS

Patent application No. 930078–3 filed Mar. 22, 1993.(Abstract only).

Primary Examiner—Teresa Walberg
Assistant Examiner—Vinod D Patel
Attorney, Agent, or Firm—Burns, Doane, Swecker & Mathis, L.L.P.

[57] ABSTRACT

An optical fiber welding apparatus comprises two casing halves (33) which are rotatable about shafts (51). The casings have their movements coupled to each other by cooperating gear segments and prevent exterior dust particles from reaching the welding location and protects the operator from the welding arc and possible emissions therefrom. The casings (33) have such a shape and are so mounted that they enclose the interior of the apparatus in a space-saving way. On the frame (11) of the welding apparatus, to which the shafts (51) are attached, loose fiber retainers are placed on surfaces intended therefor which have a weak slope. In order to retain the optical fibers an elastic magnetic retainer mechanism (71) is provided in order to press inserted fibers against alignment grooves. The surfaces, which press against inserted fibers, can be elevated a little in the closed position of the casings by operating a button (99), which acts on a lever (91), whereby the final position of inserted fibers can be adjusted. Further, in the frame (11) cavities are arranged where separate camera units (29) are placed. To obtain a background illumination light emitting diodes (21) are arranged, the light of which is reflected towards the welding location by mirrors (35) attached to the inner side of the casings (33).

22 Claims, 7 Drawing Sheets

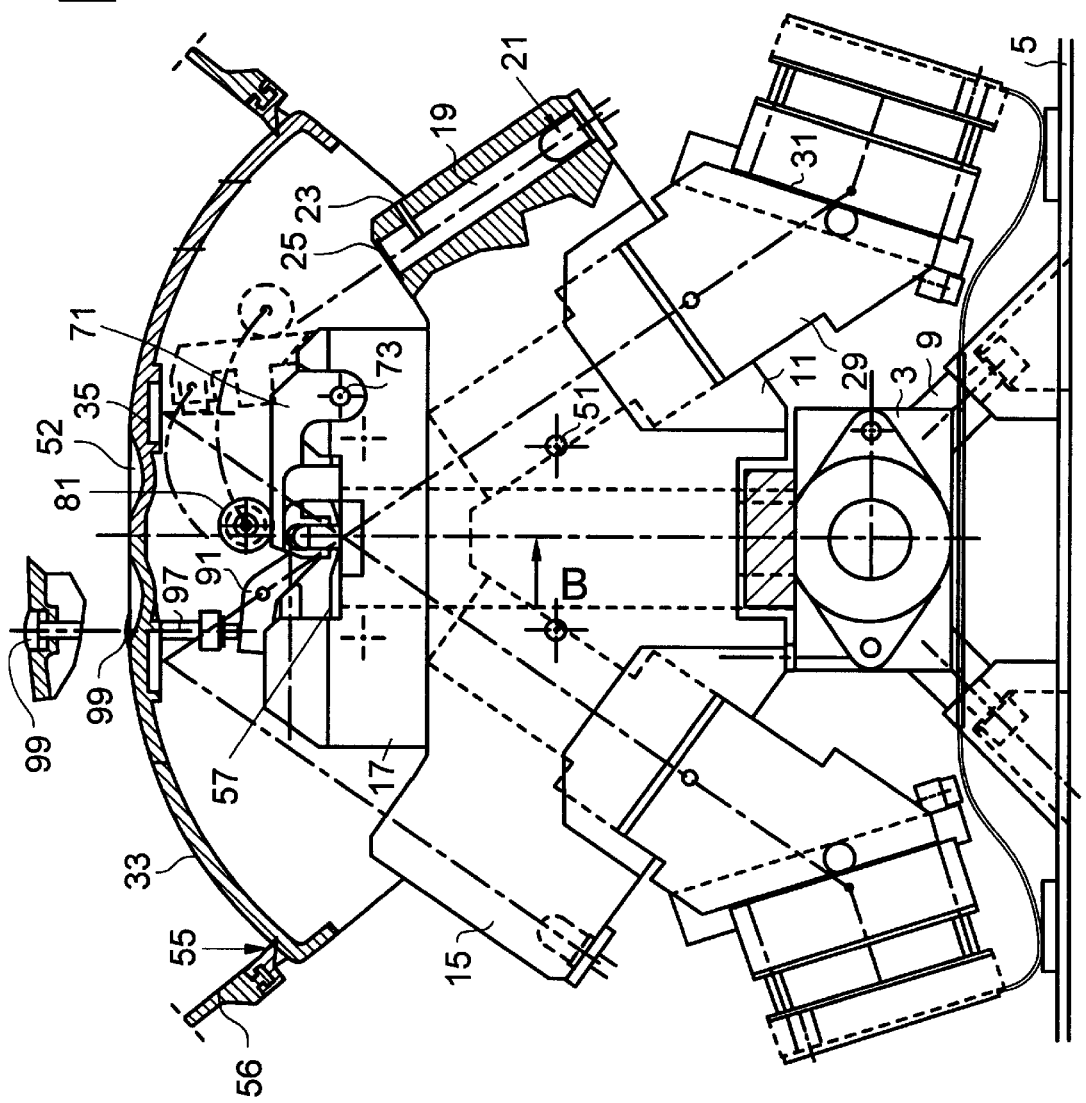

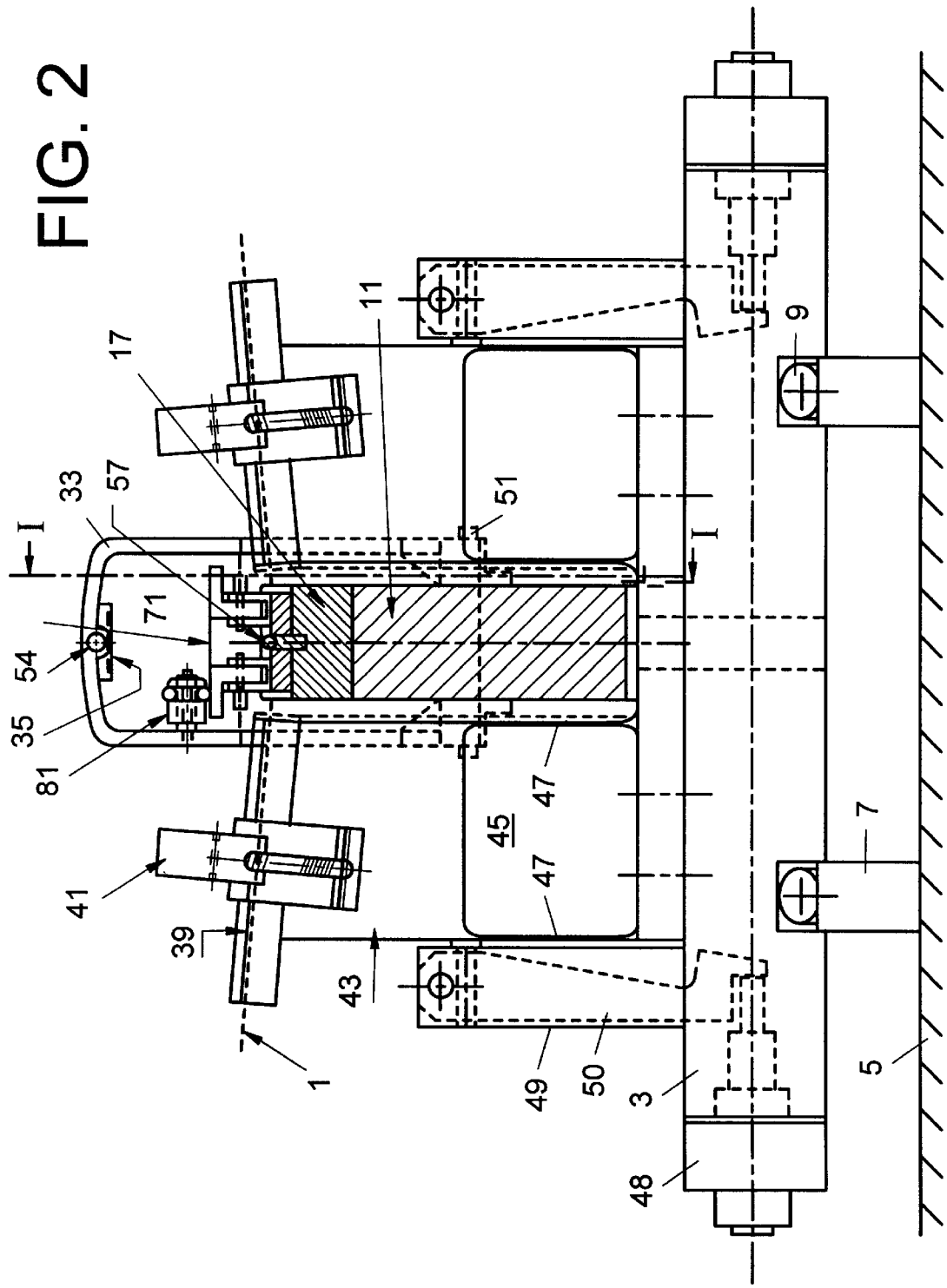

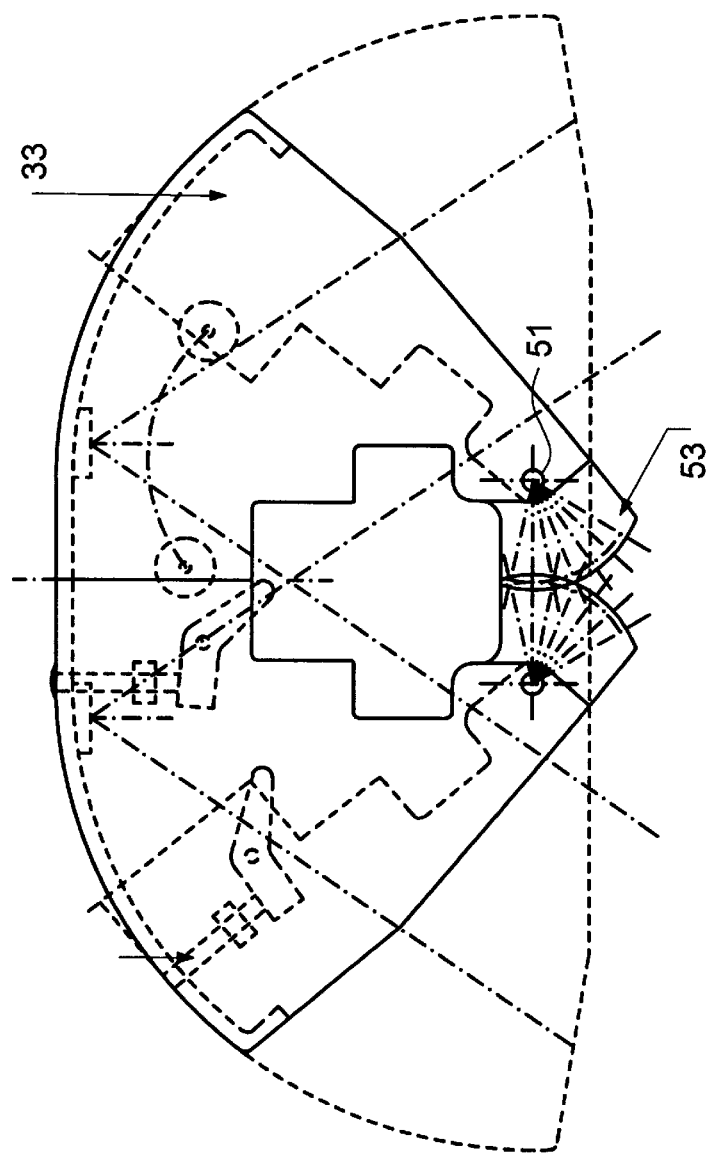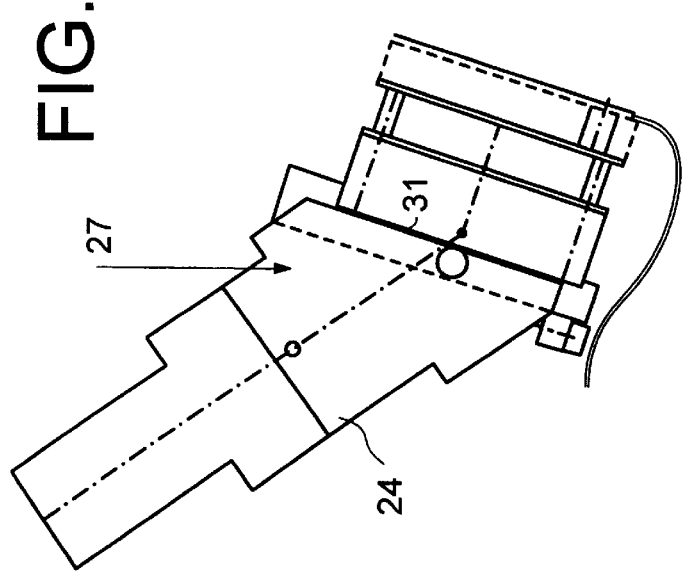

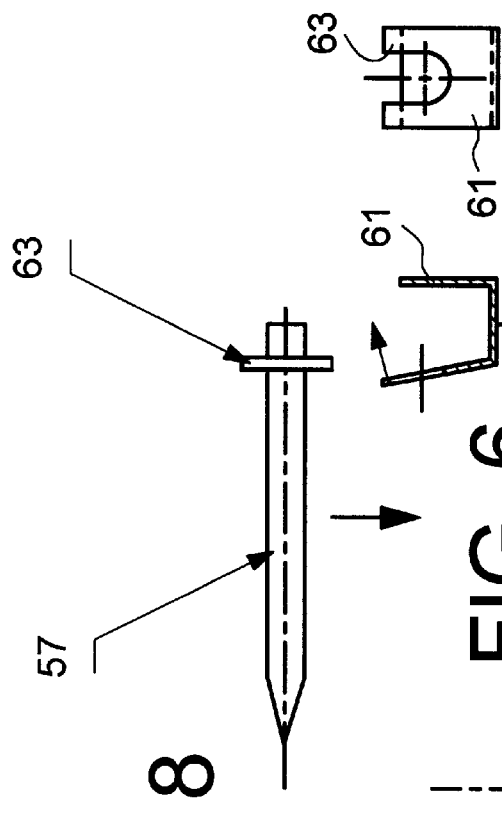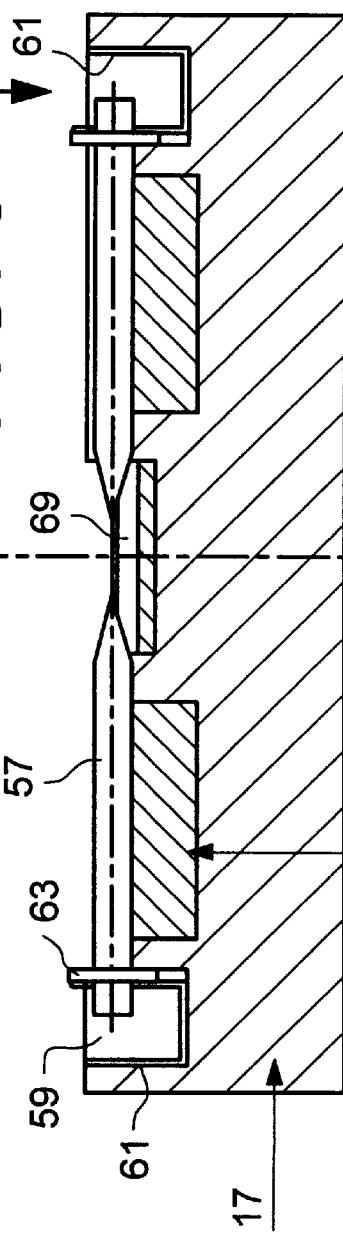

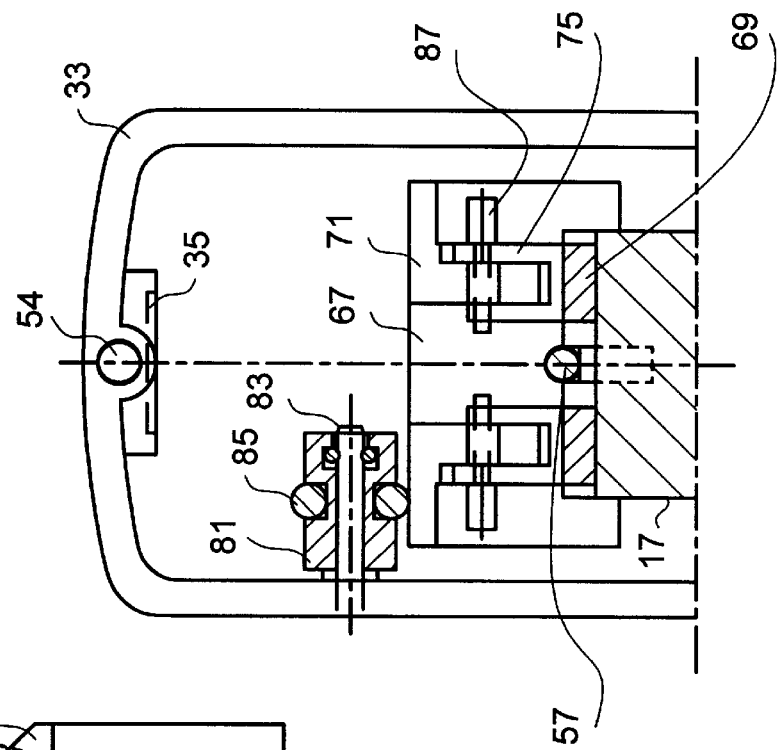
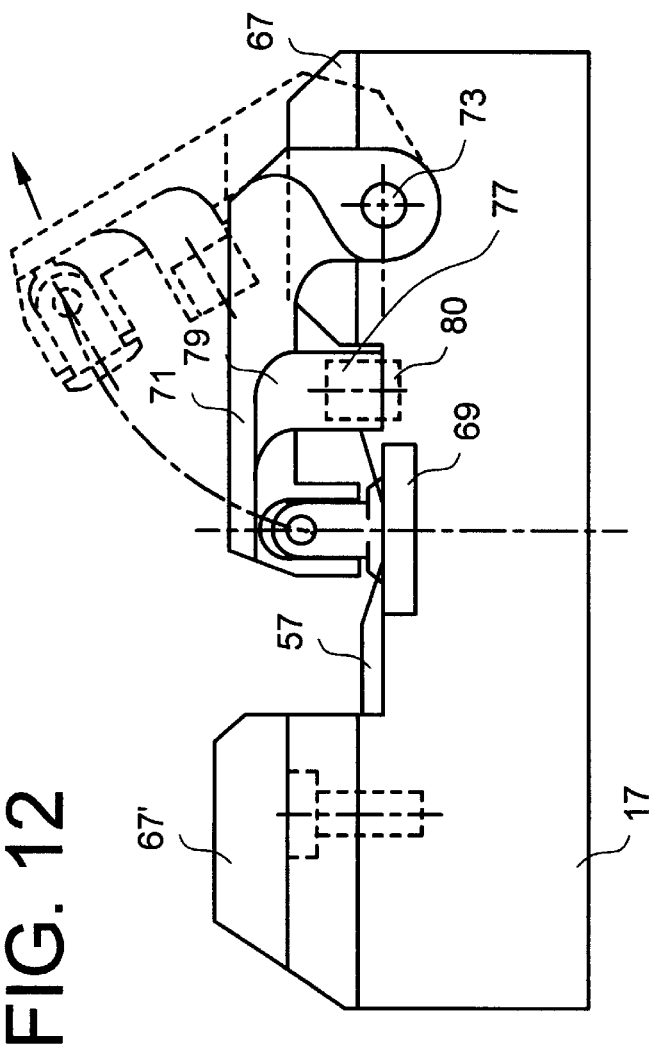
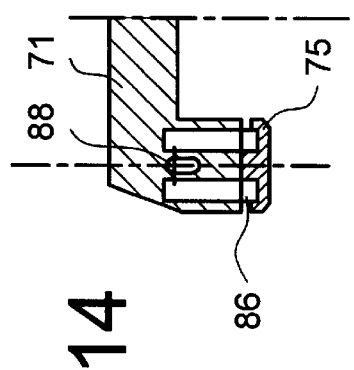

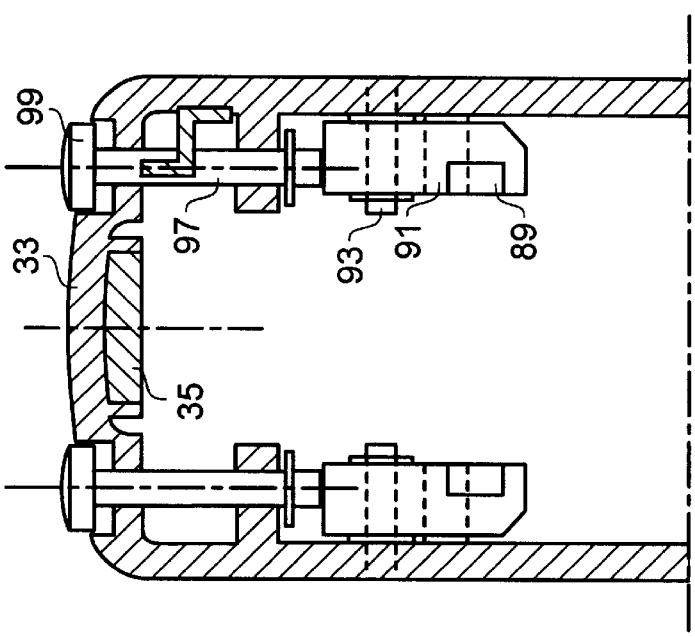
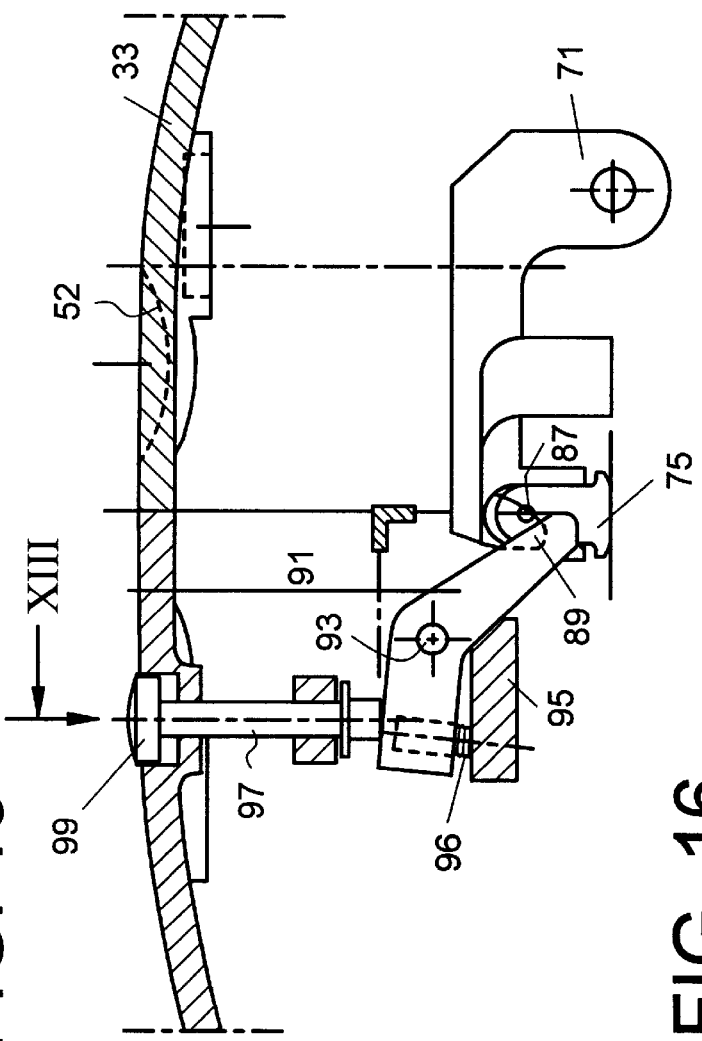
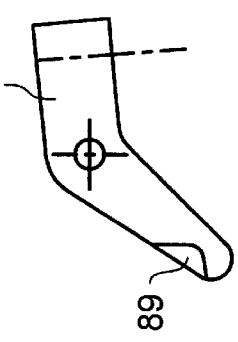

“5,961,865”

SHIELDED WELDING DEVICE FOR OPTICAL FIBERS

The present invention relates to a fiber welding device for welding optical fibers to each other, in particular for welding optical fibers composed to a fiber ribbon to each other, and to subassemblies used in a fiber welding device.

BACKGROUND

In the fiber optical communication technology optical fiber ribbons, i.e. optical fibers, which by an exterior polymer sleeve are kept together to form a flat fiber package having a plurality of optical fibers extending in parallel, are more and more used. Typically a fiber ribbon can contain 4, 6, 8 or 12 individual fibers. When splicing such fiber ribbons to each other in a secure way, preferably welding can be used. Then, with the growing use of optical communication fibers, devices are required which can be used in the field. Such a welding device should among other things have a good shielding of the region around the splicing location, in which the very electrical arc is formed at the ends of the optical fibers, so that an operator of the welding device is well protected. A shielding would also protect this area against contamination from the surroundings. Furthermore, in order to obtain sufficiently good splices of two fiber ribbons a number of different conditions must be fulfilled, such as that the individual optical fibers in the opposite ends of two fiber ribbons are well aligned with each other, that the alignment can be checked immediately before the welding operation and that the alignment then can possibly be corrected. Also, a background illumination of the fiber ends to be spliced to each other should be provided in order to obtain pictures for checking the positions of opposite fiber ends.

U.S. Pat. No. 5,524,163, which corresponds to the published European patent application No. 0 720 032, discloses a device and a method for splicing optical fibers. The device comprises a microscope unit, a light emitting diode holder placed above the fibers and a cover enclosing the light emitting diode retainer. The microscope unit consists of a housing, three microscopes, a shutter unit, two mirrors and a CCD-sensor. The light emitting diode retainer, which comprises three light emitting diodes, is mounted to swing about the same shaft as the cover and is locked in a swung-down position by means of a magnet. A background illumination is obtained from the light emitting diodes directing light from above to the welding location. The light from the welding location is deflected by mirrors to reach a photodetector.

U.S. Pat. No. 4,914,797 and the published British application No. 20 052 786, which corresponds to German patent No. 30 19 425, disclose welding devices comprising a housing which is or can be mounted to swing. This British patent application, the published German patent application No. 32 45 229 and the published European patent application No. 0 494 809 disclose welding devices having different types of optical detection devices comprising mirrors among other things.

The published International patent application WO 96/27811 discloses an illumination of the welding location comprising a light source located under the horizontal plane through the welding location, the light from the light source being deflected by two mirrors placed in a lid of the device.

The cited U.S. Pat. No. 5,524,163, U.S. Pat. No. 5,046,813, the Japanese patent application No. 59-38 718 and the German patent No. 41 23 227 disclose hold-down mechanisms for optical fibers provided with springs and/or magnets.

SUMMARY

It as an object of the invention to provide a fiber welding device, which comprises a plurality of different functions, this being attained using a small number of components.

It is another object of the invention to provide a fiber welding device, in which the built-in functions require a small number of adjustments or settings.

It is another object of the invention to provide a fiber welding device, in which the mechanical and optical components for performing the very welding operation are composed to form a detachable unit included in the complete welding device, the welding device in addition containing electronic circuits, image processing, display monitor, etc., in order to achieve a simplified mounting, service, testing, etc.

It is another object of the invention to provide a fiber welding device, in which the mechanical and optical components for performing the very welding operation are comprised in different whole modules, such as a camera/an optical unit, an electrode housing, etc., in order to allow a simple service of the device, without requiring any advanced adjustment of different components.

It is in particular another object of the invention to provide a fiber welding device, in which the very welding location, when performing the welding operation, is shielded in order not to radiate electromagnetic fields, which are generated by electronic circuits and in particular high voltage circuits and high voltage lines, in order to fulfill demands from different authorities.

It is another object of the invention to provide a fiber welding device, in which casings are arranged around the mechanical, electrical and optical components which are arranged at the very welding location, which casings allow a complete sealing of the corresponding space and the design and movement of which are such, that they occupy a minimal space in the complete welding device and in particular do not obstruct manual operations at the welding location.

It is another object of the invention to provide an electrode housing comprising V-grooves for aligning fiber ends in a fiber welding device, which allows a simple placing of the fiber ends and a simple possible subsequent final adjustment of the positions of the fiber ends and a secure retainment of the fiber ends.

An optical fiber welding device for welding fiber ribbons has a casing which is movable between a closed position and an open position. In the closed position the casing is located above and at the sides of the welding location and encloses at least in an upward direction, in a direction parallel to inserted fibers and in horizontal directions perpendicular to inserted fibers the welding location and also the components of the device which are located at the welding location such as electrodes and an electrode housing. The casing is made of thin plate-shaped or sheet material and has a space-saving design and in particular the movement thereof is space-saving, since the casing performs a sliding moving so that in its movement the surfaces of the casing are all the time all located in substantially the same contiguous and continuous surface. The surfaces of the casing then corresponds to a part of this continuous surface. The continuous surface preferably has a rotational symmetry about an axis. This axis is then also a rotational or swinging axis of the casing. The axis is located so that no part of the casing ever moves towards the head of an operator, which normally, when inserting and inspecting fibers, is located above the welding location. At the welding location, the inserted fibers are supported by some support and alignment means, such as a V-groove plate. Thus, the highest points of the casing will in its movements always have substantially the same height over the welding location, the term height being here taken to mean the distance from the welding location to the highest points in a direction perpendicular to the fiber portions at the welding location and away from the body of the welding device and support and alignment means of the fibers. The rotational axis of the casing will then preferably be located at a position below the welding position, at some distance from that position and for instance in parallel to the inserted fiber ends.

Preferably, the casing comprises two casing halves, which are mounted to swing around parallel shafts, the shafts being arranged at locations approximately vertically below the very welding location, at not too a small distance thereof. The casing halves, which are mechanically coupled to each other through a mechanical coupling comprising cooperating gear segments and thereby simultaneously and symmetrically move towards and away from each other, also in the case where only one half is operated, protect in their closed positions exterior dust particles from reaching the welding location and protect the operator from the electric welding arc and high electric and magnetic fields and loose particles. The casings have a design which saves space and in their movement occupy a minimum of space, by the fact that they are designed as substantially sectors of the surface of a rotationally symmetric body such as a circular cylinder and by the fact that the rotational axes of the casings are placed at the points of the sectors, ordinarily very near each other.

On the frame of the welding device, to which the shafts are attached, loose fiber retainers are mounted on slightly sloping surfaces intended therefor, so that the individual fibers, owing to a resulting small bending, are placed in corresponding V-grooves arranged at the welding location. In order to fix the optical fibers in the V-grooves a hold-down mechanism is provided comprising a single arm, which is mounted to be capable of a swinging movement and which has elastic hold-down surfaces at its exterior end distant from the swinging axis of the arm. The hold-down surface can be detached from the fibers also when the casing halves are in closed positions by operating levers, which facilitate in the case when the positions of the fibers in the V-grooves have to be adjusted. In the frame furthermore openings are provided, in which separate camera units are placed. For a background illumination of the welding location, when capturing pictures for checking the fiber positions and for an automatic placement of corresponding fiber ends at each other, light emitting diodes are arranged, the light of which is reflected towards the welding location by mirrors attached to the inner sides of the casings.

Generally thus, a casing for a fiber welding device can comprise two casing halves, which are configured substantially identically to each other and which are mounted to be capable of swinging around suitably placed shafts, so that the halves can move in directions towards each other in order to engage with each other, so that the region around the electrodes is closed, and in directions away from each other in order to make the same region accessible. The shapes of the casing and thus of the casing halves are such and in particular the shafts of the casing halves are located at such positions below the welding location, that the topmost point of the casing or casing halves at its/their movement between a closed position and an open position, i.e. for the casing halves in directions away from and towards each other, remains at a substantially constant height. This condition results in that no part of the casing is in an obstructing way arranged at the very welding location, to which one then can have access when inserting fibers and removing them. In addition, in order that the casing and the casing halves will also be well arranged around the inner parts of the device also in an open position, a swinging shaft of the casing or the shafts of the casing halves are advantageously located at positions which are placed substantially straight below the welding location, at a distance below it, which can for example correspond to substantially half the width of the inner portions of the device, the width being taken in the same direction as the movement directions of the casing or casing halves, i.e. perpendicularly to the longitudinal direction of inserted fibers.

An electrode housing is advantageously made as a single unit having means attached thereto for retaining electrodes and means for aligning and retaining fibers. The electrodes and the welding location are located at the top surface of the electrode housing. Then also the swinging shafts of the casings halves are located below the electrode housing.

The casing halves can generally comprise flat side portions, which are perpendicular to the swinging shafts, and furthermore top portions, which connect the side portions at the exterior edges thereof and which comprise portions, which have the shape of a part of the envelope surface of a circular cylinder, where the axis of the cylinder coincides with the shaft of the respective casing half, i.e. a casing half can have the shape of substantially a sector of the exterior border surface of a circular-cylindrical body. The top portions can also comprise substantially flat inner portions, which in their position, in which the casing halves are arranged at each other, are located at each other in the same horizontal plane and at their edges at a distance from the border surface between the casings connect to the portions having a part-cylindrical shape. Sealings can then be arranged at a distance from the border plane of the casing halves, in the closed positions thereof, so that they are always engaged with those portions of the top portions, which have the shape of the envelope of a part of a cylinder, i.e. so that the distance is longer than the length of a flat portion of the top portions.

The movements of the casing halves are furthermore advantageously mechanically coupled to each other using a suitable mechanical coupling, so that for manually operating a first casing half in order to move it in a direction towards or from a second casing half also the second half is moved in the corresponding way, in a direction towards or from the first casing half respectively. Operating using a single hand is thereby possible. The mechanical coupling can then comprise gear segments engaging each other, which are arranged at vertical side portions of the casing halves, the axes of the segments coinciding with the swinging shafts of the casing halves.

Furthermore, the device can comprise fiber alignment means such as V-grooves, hold-down means, which are movable between a down-folded position for retaining fibers in the fiber alignment means and a folded-up position for releasing fibers introduced in the alignment means and naturally electrodes connected to a high voltage source for forming an electric arc between the points thereof. Bringing-down means can then be coupled to the casing in order to operate, in the movement of the casing from an open to a closed position, the hold-down means, in the case where they are in folded-up position, in order to move them to the folded-down position. The bringing-down means advantageously comprise a rotatable wheel attached to a casing half, which in the movement of the casing half, from an open to a closed position, cooperates with a top surface of the hold-down means.

The hold-down means can furthermore comprise a single hold-down arm, which is movable between a folded-down position for retaining fibers in the fiber alignment means and a folded-up position for releasing introduced fibers, where the swinging shaft of the arm is parallel to the longitudinal direction of introduced fibers and in approximately the same horizontal plane as the fibers. The hold-down means can comprise hold-down units, which are movably arranged at the end of the hold-down arm and which are elastically biassed to contact the top side or surface of fibers inserted in the alignment means, when the hold-down arm is in its folded-down position, and to then press in a direction perpendicularly to inserted fibers and in a direction towards the alignment means in order to retain the fibers therein. The hold-down units advantageously comprise two hold-down elements, which are individually movable and which each acts on fibers on only one side of the welding location. In the folded-down position of the hold-down arm the hold-down units are thus movable in a direction perpendicular to inserted fibers and then releasing means can be arranged for lifting, when these releasing means are operated, the hold-down units, all of the hold-down arm still maintaining the same folded-down position so that fibers inserted in the aligning means are released from the alignment means and the position thereof can be adjusted. The releasing means can comprise a lever, which is movably mounted at a casing half and which has an upper end, which is accessible from the exterior side of that casing half and can be operated therefrom. This design facilitates the exact introduction of the fibers in the V-grooves.

Light sources can advantageously be arranged in order to provide a background illumination of the ends of the fibers at the welding location and then mirrors can be provided at the interior side of the casing for deflecting light from the light source, so that it hits the ends of the fibers, only when the casing or casings are in closed positions. This results in an advantageous location of the light sources, by the fact that they as well as cameras for capturing pictures of the welding location can be located below a horizontal plane extending through the very welding or splicing location, this horizontal plane then also extending through all of the fiber ends in the case where a multitude of individual fibers are simultaneously spliced to each other, i.e. when opposite fibers forming a plurality of pairs such in fiber ribbons are spliced. As few as possible of the components included in the device will thereby be located above said horizontal plane, which results in a good availability of the welding location and which results in that the casing can be given the shape as described above and still enclose the welding location well in its closed position. The placement of the light sources is furthermore such, that light from the light sources extends in an oblique angle to the respective mirror, i.e. neither substantially vertically nor horizontally, when the mirrors have the position which is obtained when the casing is closed. The light is deflected by the respective mirror, so that it after that also travels in the same oblique angle in relation to the surface of the mirror, but also in relation to a vertical or horizontal plane. The first oblique angle to the mirror and the latter angle as taken in relation to the horizontal plane can be comprised within the interval of 15–75°, preferably within the interval of 30–60°, most desired it would be 45° but in a practical embodiment of the device between 35 and 40°. The reflecting surface of the mirrors is furthermore located in a horizontal plane, when the casing is in its closed position, i.e. in parallel to a plane through the fiber ribbons, the fibers of which are to be welded to each other.

Generally there are thus two sets of a light source, a mirror and a light detector. The two sets are arranged symmetrically in relation to the optical fibers and the welding location. Light from the light source in a first one of the sets passes in a first plane to the mirror and from the mirror to the light detector of the first set and light from the light source in a second one of the sets passes in a second plane to the mirror and from the mirror to the light detector of the second set. The first and second planes then preferably substantially coincide and are also substantially perpendicular to the longitudinal direction of the ends of the optical fibers at the welding location.

The electrode housing of the welding device can comprise a substantially rectangular block of a material which is isolating against electrical high voltages and has grooves, which are arranged in a top surface of the block. In the grooves the electrodes are arranged and at the bottom portions of the grooves contact plates are arranged for electrical contact with the electrodes and connection to an electrical high voltage source. The grooves then have for example a substantially quadratic or in any case a rectangular cross section. The bottoms of the grooves can through a significant portion of their length be constituted by a surface of a contact plate in order to provide a secure contact with a corresponding electrode. Thus, the surface of the bottom of this groove, which is constituted by a surface of a contact plate, can correspond to a significant portion, i.e. more than half, of the length of the electrodes. The grooves are of course arranged along the same line. The electrodes are in the conventional way made as elongated, substantially cylindrical bodies, but they can at their rear ends have extending abutment parts, such as annular projections. Transversal recesses are then arranged at the rear ends of the grooves having suitable abutment or support surfaces for contacting the abutments parts of the electrodes. The electrodes can thereby be given accurately defined positions in their longitudinal direction. Elastic means such as spring plates can then be arranged in the transversal recesses in order to elastically press the electrodes in a direction towards each other, so that the abutment portions of the electrodes are securely engaged with the abutment or support surfaces in the recesses.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 1 is a side view, partly in a cross-sectional view, of a welding device for optical fiber ribbons, as seen in the longitudinal direction of the device and of inserted fibers, FIG. 2 is a side view, partly in a cross sectional view, of the welding device in FIG. 1, but as seen perpendicularly to the longitudinal direction of the device and of inserted fibers, FIG. 3 is a side view of a camera unit, FIG. 4 is a side view of shielding casings as seen in the longitudinal direction of the device, FIG. 5 is a sectional view of an electrode housing included in the device, FIGS. 6 and 7 are side views of a spring plate, FIG. 8 is a side view of a welding electrode, FIG. 12 is a side view of part of the electrode housing, having the hold-down arm mounted thereto, FIG. 13 is a side view, partly as seen in a cross-sectional view, showing the front side of the hold-down arm and a bringing-down roller, FIG. 14 is a sectional view of the front portion of the hold-down arm at an elastic hold-down unit, FIG. 15 is a side view, partly as seen as a sectional view, showing a mechanism for releasing inserted fibers, FIG. 16 is a side view as seen from the interior side of a lever in the mechanism of FIG. 15, and FIG. 17 is a side view, partly as seen in a cross sectional view, showing the release mechanism in FIG. 15, as seen perpendicularly to the longitudinal direction of the device.

DETAILED DESCRIPTION

Figure 10:
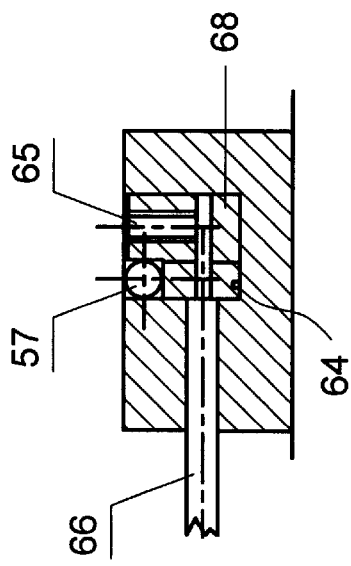
FIG. 10 is a sectional view of the electrode housing showing a contact body including an electric cable.

In FIG. 1 a view is shown, partly as a sectional view, of a fiber welding device in particular intended for welding optical fiber ribbons. In FIG. 1 the view/section is taken substantially centrally through the device and the view is seen in parallel to and the sectional surfaces perpendicularly to the direction of the fibers which are to be welded to each other. In FIG. 2 a view is shown, which also partly is a cross-sectional view, of the welding device, in which the view is taken in a direction perpendicular to the fibers as indicated at 1 and the sectional surfaces are parallel to the fibers, so that this picture is perpendicular to the picture of FIG. 1. The components of the device are carried by an elongated frame bar 3 having a rectangular cross section, which is supported on a base 5 by means of four oblique legs 7. The legs 7 can comprise elastic, cushioning intermediate pieces, such as 9. Centrally on the frame bar 3 is a centre frame 11 attached and stands up therefrom. The centre frame 11 has generally an isosceles triangular shape, as seen in a longitudinal direction parallel to the frame bar 3 and to inserted fibers, the triangle having its point between the two equal legs directed downwards towards the frame bar 3 and having an upper, substantially horizontal and flat surface and having two symmetrically located projections or triangular halves 15. These halves protrude perpendicularly to the direction of inserted fibers and are cut off at their triangular points by surfaces, which extend in an angle perpendicular to the oblique sides of the triangular shape. The projections 15 carry light sources and cameras, see hereinafter.

The horizontal top surface of the centre frame 11 carries an electrode housing 17, to which parts are attached, which are required for retaining the ends of the fibers and for the alignment thereof with each other, and further welding electrodes, as will be described hereinafter. At the exterior sides of the projections 15 oblique cylindrical through-holes 19 are provided, which extend in parallel to the exterior cut-off sides of the projections and the axes of which are located in a vertical centre plane. This centre plane is simultaneously a symmetry plane of most of the components of the device and in this plane also the end surfaces of the fibers to be spliced to each other are located. The axes of the holes 19 and the exterior cut-off surfaces of the projections 15 are located in an angle of between 30 and 45° in relation to a vertical plane, in the preferred case in an angle between 35 and 40° and preferably about 37°. In the holes 19 light passes from light sources arranged in the bottom end of the holes, such as from light emitting diodes 21.

Light from the light emitting diodes 21 passes in the holes 19 towards the upper ends thereof but is first reduced in intensity by diaphragm plates 23, which are constituted by plates, which perpendicularly project into the interior of the holes 19 and are arranged in slots in the centre frame 11 at a distance from the top openings thereof, this distance being approximately equal to the diameter of the holes 19. The aperture plates 23 have a straight inner or lower edge and project into approximately the centre of the holes 19, so that the light is allow to pass through a window, having an approximately semi-circular shape. At the top openings of the holes 19 light diffusing means are arranged, such as suitable optical gratings 25, in order to produce a uniform illumination.

Camera units 27, see also FIG. 3, are inserted with their front parts in corresponding holes in the oblique surfaces of the inverted triangular shape of the centre frame 11. The camera units 27 have a front part 29, which contains their optical systems. The optical axes of the optical systems are parallel to the axes of the holes 19 and cross the longitudinal axis of the fiber ribbons to be spliced, exactly in the splicing plane and are preferably also located in this plane. The prolongations of the holes for the camera units 27 continue up to the bottom sides of the electrode housing 17 in order for light from the splicing region of the fibers to be imaged by the optical systems on light sensitive elements of the camera units 27, the light sensitive elements being located at a plane 31 and arranged in an oblique angle and thus not perpendicularly to the axes of the optical system, this angle being adapted to produce a sharp picture of all individual fibers in fiber ribbons to be spliced.

The upper part of the centre frame 11 and the electrode housing 17 are protected by two identical casing halves 33, which are capable of swinging towards and away from each other. On the interior side of the casings, at the topmost portions thereof having approximately horizontal surfaces, mirrors 35 are arranged having horizontal reflecting surfaces. The mirrors 35 are placed, so that light rays from the light diffusing means or diffusor elements 25 can be mirrored therein and reflected by their reflecting surfaces, so that the reflected light rays can enter the optical systems of the camera units 27 and be conducted therein towards the light sensitive surfaces in the camera units.

The fiber ribbons 1 to be spliced are retained, see FIG. 2, by fixtures or retainers 39, which are retained by locking elements 41 at the somewhat sloping top surfaces of parallelogram blocks 43, see Swedish patent application 9300578-3, filed Mar. 22, 1993. The parallelogram blocks 43 are thus arranged having their longitudinal direction perpendicular to the triangular shape of the centre frame 11. They have rectangular recesses 45 comprising thin, uniformly thick, remaining vertical portions 47. Their bottom portions are attached to the top side of the frame bar 3 and their top portions comprise the sloping planes, at which the fixtures 39 are located. The top portions of the parallelogram blocks 43 can be moved from their rest positions having the vertical portions 47 in a straight configuration to positions closer to the transversal symmetry plane of the device by operating control motors 48 acting on levers 50 arranged in posts 49, which are attached to the frame bar 3 outside the parallelogram blocks 43. Then the straight vertical portions 47 are somewhat bent.

The casing halves 33 which have identical shapes and are rotatable around shafts 51, which are located in the longitudinal direction of the device, i.e. generally also in the longitudinal direction of the fibers 1, see also FIG. 4. Recesses 52 intended for thumbs of an operator in order to make the opening and closing movement are arranged on the outside of the casings 33, close to the border surface, the recesses being visible in FIG. 1. The movements of the casing halves are coupled to each other by gear segments 53 engaging each other, so that the casings move in a coupled way towards or away from each other in order to seal, in their position engaging each other at the border surface, the space around the electrode housing 17 at least in directions upwards. In their sealing positions in engagement with each other the casings are retained at each other by a magnet 54, see FIG. 2, arranged on one of the casings for cooperation with a corresponding armature on the other casing.

The casings 33 provide a shielding from exterior particles and protect the operator from the electric arc used in the welding operation. They have a design which saves space and their shafts are so arranged, that the casings in the movement are always located close to the interior parts of the welding device. The casings 33 have upper portions and side portions, the latter generally having the shape of circular sectors. The shafts 51 are arranged in regions at the sector points and at the interior sector edge and adjacent to the sector points also the gear segments 53 are located. In order to sense the movements of the casings microswitches are provided, not shown, which are arranged to cut-off the current from a possible electrical high voltage, which is supplied to the electrodes, in order to protect the operator.

The exterior parts of the top portions of the casings 33 have generally the shape of parts of an envelope surface of a circular cylinder, the axis of the cylinder coinciding with the respective shaft 51. The inner parts of the upper portions at the border surface between the casing halves are essentially flat and are located in the same horizontal plane, when the casings are brought to each other. The mirrors 35 are arranged at the connection to the outer-most, part-cylindrical parts. Sealings 55, see FIG. 1, are arranged in protruding edges 56 of an exterior protecting housing, not shown, and are engaged with the part-cylindrical parts of the casings 33 and the side surfaces. They are arranged, so that they seal against the casings, in any positions thereof. In the positions when the casings are brought to each other the seals engage with regions near the outer-most edge of the part-cylindrical parts of the top portions of the casings, whereas they in the positions of the casings when they are separated from each other as much as possible, engage with regions near the connections of these portions to the flat portions.

The electrode housing 17, see FIG. 5, comprises a substantially rectangular block of high voltage resistant polymer material. Electrodes 57, between the points of which an electrical arc is formed in a splicing operation, are located in grooves having quadratic cross sections. The grooves are made in the top surface of the housing 17 and extend centrally in the longitudinal direction of the housing, perpendicularly to the fibers to be welded to each other. At the rear portions of the grooves transverse recesses 59 are provided, see also the view from above in FIG. 9, in which spring plates 61 are arranged. The spring plates, see FIGS. 6 and 7, have a U-shape, comprising a cut-out 63 in the leg of the U-shape, which faces the points of the electrodes. Through the cut-outs 63 the rear portion of the electrodes 57 pass in order to be pressed by the marginal portions of the plates adjacent to the cut-outs in a direction towards their front ends or towards their points by cooperation with abutment rings 63 rigidly attached at a small distance from the rear ends of the electrodes, see also FIG. 8. These abutment rings also form stops for the movement of the electrodes 57 in this direction and thereby defines by engaging with the corresponding front side surfaces in the recesses 59, the position of the electrodes in their longitudinal directions.

Electric high voltage is conducted to the electrode 57 from electrically conducting, elongated contact bodies 64 having a rectangular cross section, which are placed tightly in recesses in the electrode housing 17 below the grooves, in which the electrodes are located, see also the sectional view in FIG. 10, so that the contact bodies have contact with the bottom surface of the electrodes 57 along a generatrix thereof over a major portion of the length of the electrodes. The contact bodies 64 have a portion 68, projecting to the side and horizontally and having the shape of a rectangular block, at approximately their centre portions, which projecting portion is arranged tightly in a corresponding recess in the electrode housing 17 and has its top surface located in the same plane as the top surface of the electrode housing and its bottom surface in the same plane as the bottom surface of the oblong portions of the contact bodies. Screws 65 of a suitable metal pass in threaded bores down from the top side of the projecting portion 68 of the contact bodies 64. The screws 65 press with their lower ends against end portions, from which the electric isolation has been removed, of electrical high voltage cables 66, which thereby are pressed against the bottom surface in holes in the bottom portions of the contact bodies 54, through which the ends carrying no electric isolation enter. Corresponding holes are made from one side of the electrode housing 17, so that the cable ends can be entered therethrough into the holes of the contact bodies 64.

On top of the rear portions of the electrodes 57 retainer blocks 67, 67' are attached by means of screws, see FIG. 12, which secure the electrodes finally in the position in which their abutment rings 63 engage in the recesses 59. One retainer block 67' is higher than the other block 67 and carries at its top elevated portion a light source, not shown, which directs a light beam to the very welding location. This arrangement facilitates when inserting fibers and adjusting them in the respective V-grooves in the case where the surrounding illumination is bad.

Figure 9:
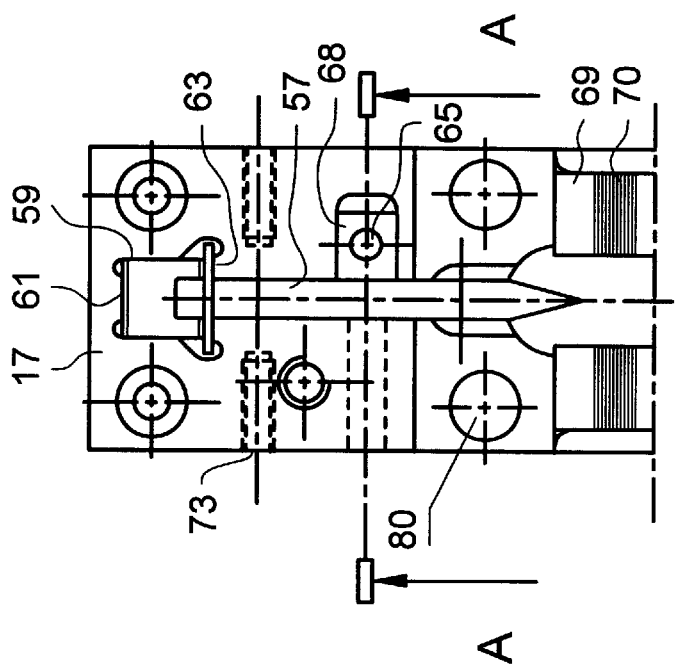
FIG. 9 is a view from above of a part of the electrode housing having no mounted hold-down arm.
Figure 11:
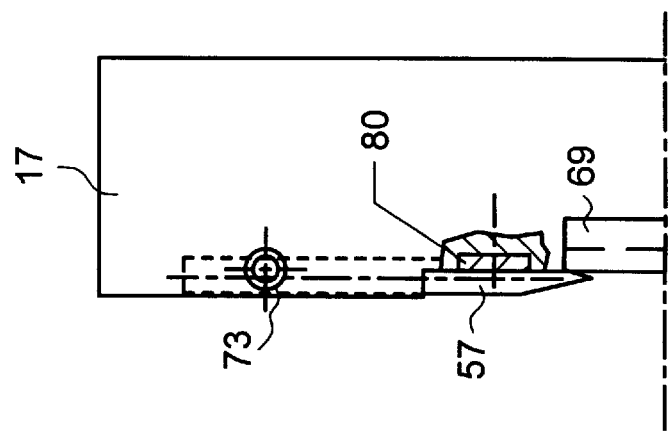
FIG. 11 is a side view of part of the electrode housing, in particular showing a magnet armature.

Centrally in the electrode housing 17, in a transverse recess in the top surface thereof, a ceramic V-groove plate 69 is provided, which has a central recess, which interrupts the V-grooves 70, see FIG. 9, and has a location corresponding to the region between the points of the electrodes 57, in which the electric arc is formed, when welding fibers to each other. The fibers are retained at their positions in the V-grooves 70 by means of a hold-down arm 71, which is mounted to be movable in the electrode house 17 about a shaft 73 parallel to the longitudinal direction of the device and the fiber direction. The hold-down arm 71 has at its front end two individually movable hold-down units 75, see also FIGS. 13 and 14, which are individually elastically biassed and come in contact with the top side of the inserted fibers, when the hold-down arm is folded down, one of the hold-down units with fibers on one side of the splicing plane and the other one with fibers on the opposite side of the splicing plane. This arm is maintained in a folded-down position by a magnet 77, which is located at a projection 79 on the arm 71, which in the folded-down position engages with an armature 80 located in a recessed top surface of the electrode housing 17, which is located close to the V-groove plate 69, see FIGS. 9 and 11.

The hold-down arm 71 is automatically folded down, when the casings 33 are brought to their closed positions. This is produced by means of a freely rotatable wheel 81, see FIGS. 13, 2 and 1, which rotates about a shaft 83 attached to the side wall of the corresponding casing half 33. The wheel 81 has a groove at its periphery, in which a rubber ring 85 is mounted, and this ring comes in contact with the top side of the hold-down arm 71 and can bring it downwards, when the casing half is rotated inwards.

The hold-down units 75 are, as has been mentioned above, elastically arranged. They have a U-shape, as seen perpendicular to inserted fibers, see FIG. 13, and the legs of the U-shape are located in recesses, see FIG. 9, on the sides of the front of the hold-down arm 71 having a fork-shape, see also FIG. 13, in which each fork arm with its front end is bent downwards. Two helical compression springs 86 are located in holes extending upwards in the fork arms, see FIG. 14, and act between the bottoms of these holes and the bottom web portion of the U-shape in order to press the hold-down units 75 in a direction perpendicular to the longitudinal direction of the hold-down arm 71, so that they in the folded-down position of the hold-down arm press vertically downwards. A pin 87 is attached in holes in the legs of the U-shape and pass through an oblong hole 88 in the hold-down arm, so that it and thereby the hold-down elements 75 can move vertically, as seen in the folded-down position of the hold-down arm 71. The pin 87 projects through some distance towards the free side of the hold-down arm 71.

In the folded-down position of the hold-down arm 71, see FIG. 15, these projecting portions of the pins 87 can cooperate with recesses 89 on the interior side of levers 91, see also FIGS. 16 and 17. These levers 91 are movably mounted at shafts 93, which are attached to the side portions of the protecting casing halves 33. Such a lever 91 has then the recess 89 at one of its ends, whereas the other rear end, which is located on the opposite side of the lever shaft 93, is influenced as its bottom side by a helical compression spring 96 acting between this end and a support block 95, so that the front end of the lever 91 is located in the lowest position possible. The support block 95 is attached to a vertical side portion of the protecting casing 33. With the top side of the rear end of the lever 91 is the lower end of a push rod 97 engaged, which is movably mounted in the casing half 33, which is located above the lever. The upper end of the push rod 97 is enlarged in order to form an operating knob 99, which is located in a recess from the exterior side of the casing 33, so the knob 99 is accessible from the outside of the casing, see also FIG. 1. When pressing it downwards the rear end of the lever 91 moves downwards and its front ends upwards. The recess 89 at the front end then engages the projecting end of the pin 87 and thereby lifts the down hold unit 75. Then possible inserted optical fibers are released and it is possible to adjust their positions. Then the knob 99 is released, whereby the fibers are again retained.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A device for welding optical fibers to each other, the device comprising fiber retaining means, electrodes connected to a high voltage source for forming an electric arc between the electrodes and a casing for shielding the electric arc and protecting ends of the optical fibers at a welding location between the electrodes, the casing being movable between a closed position in which a region around the welding location is closed and an open position in which the region is accessible, the casing being arranged to move in such a way that a highest point of the casing in the movement of the casing between the closed position and the open position is located at a substantially constant height above the welding location.

2. The device of claim 1, wherein the casing is arranged to perform a sliding movement so that in its movement all surfaces of the casing are all the time located in substantially a contiguous and continuous surface, the surfaces of the casing corresponding to a part of the contiguous and continuous surface.

3. The device of claim 1, wherein the casing has substantially a shape corresponding to a part of the surface of a body having a rotational symmetry about a symmetry axis and is rotatable about a swinging shaft having a swinging axis substantially coinciding with the symmetry axis.

4. The device of claim 3, wherein the swinging shaft is located at a position substantially straight below the welding location.

5. The device of claim 1, wherein the casing comprises two casing halves, which are substantially identical and which are mounted to be capable of swinging about swinging shafts for a movement into engagement with each other to closed positions in order to close a region around the welding location and the electrodes and away from each other to open positions in order to make the region accessible, and wherein the shafts are located at such positions below the welding location, that a highest point of each of the casing halves in movements thereof away from and towards each other is located at a substantially constant height.

6. The device of claim 1 further comprising an electrode housing having means for retaining electrodes and means for aligning and retaining fibers, the welding location being arranged at a top surface of the electrode housing and the swinging shaft being located below the electrode housing.

7. The device of claim 1 further comprising seals arranged to engage with exterior surfaces of the casing in movements thereof in order to seal a space inside the casing when the casing is in the closed position.

8. A device for welding optical fibers to each other, the device comprising fiber retaining means, electrodes connected to a high voltage source for forming an electric arc between the electrodes and a casing for shielding the electric arc and protecting ends of the optical fibers at a welding location between the electrodes, wherein the casing comprises two casing halves, the casing halves being substantially identical to each other and mounted for movement into engagement with each other in order to close a region around the welding location, in particular around the electrodes, and for movement away from each other for making the region accessible, each casing half having substantially the shape of a part of the surface of a body having a rotational symmetry about a symmetry axis and each casing half being rotatable about a swinging shaft having a swinging axis substantially coinciding with the symmetry axis.

9. The device of claim 8, wherein each casing half comprises flat side portions and a top portion, the flat side portions of a casing half being perpendicular to the swinging shaft of the casing half and the top portion of the casing half connecting the flat side portions of the casing half at outer-most edges of the flat side portions and the top portion further comprising cylinder parts, which have substantially a shape corresponding to a part of the envelope surface of a circular cylinder having a cylinder axis, the cylinder axis substantially coinciding with the swinging axis of the swinging shaft of the casing half.

10. The device of claim 9, wherein the top portion of each casing half comprises a substantially flat interior part, the flat interior parts of the two casing halves in the position of the casing halves, when they are brought to each other, being located at each other in the same horizontal plane above the welding location, each flat interior part being, at its edge distant from a boundary surface between the casing halves, connected to a cylinder part.

11. The device of claim 8 further comprising seals arranged to engage with exterior surfaces of the casing halves in movements thereof in order to seal a space inside the casing halves when the casing halves engage each other in order to close the region.

12. A device for welding optical fibers to each other, the device comprising fiber retaining means, electrodes connected to a high voltage source for forming an electric arc between the electrodes and a casing for shielding the electric arc and protecting ends of the optical fibers at a welding location between the electrodes, wherein the casing comprises two casing halves, the two casing halves being substantially identical to each other and mounted for movement into engagement with each other in order to close a region around the welding location, and for movement away from each other for making the region accessible, the device further comprising a mechanical coupling mechanically coupling the movements of the two casing halves to each other, so that when manually operating a first casing half in order to move it in a direction towards or away from a second casing half also the second casing half is moved in a corresponding way, in a direction towards or away from the first casing half respectively.

13. The device of claim 12, wherein the mechanical coupling comprises gear segments which engage with each other and are arranged on side portions of the casing halves.

14. The device of claim 12 further comprising seals arranged to engage with exterior surfaces of the casing halves in the movements thereof in order to seal a space inside the casing halves when the casing halves engage each other in order to close the region.

15. A device for welding optical fibers to each other, comprising electrodes connected to a high voltage source for forming an electric arc therebetween, fiber alignment means and at least one hold-down unit elastically biassed to contact a top side of optical fibers inserted in the alignment means and to press in a direction perpendicular to the optical fibers and in a direction towards the alignment means for retaining the optical fibers therein, the device further comprising releasing means arranged to lift, when the releasing means are operated, the hold-down units away from contact with the optical fibers, the hold-down means maintaining the position, so that the optical fibers inserted in the alignment means are released from the alignment means and their position can be adjusted.

16. The device of claim 15 further comprising a movable casing, which is movable to a closed position in order to shield a welding location and in order to protect ends of the optical fibers at the welding location and to an open position for accessing the welding location, the releasing means comprising a lever, which is movably mounted at the movable casing and which has an upper end which is accessible from an exterior side of the movable casing and can be operated therefrom.

17. The device of claim 15, wherein the hold-down means comprise a hold-down arm, which is movable between a swung-down position for retaining fibers in the fiber alignment means and a swung-up position for releasing inserted fibers, the hold-down units being movably mounted to an end of the hold-down arm and elastically biassed in relation to the hold-down arm and arranged to come in contact with the top side of optical fibers inserted in the alignment means, only when the hold-down arm is in the swung-down position.

18. The device of claim 15, wherein the at least one hold-down unit comprises two individually movable hold-down elements, a first hold-down element arranged to come in contact with a top surface of only first optical fibers, which are to be welded to second optical fibers, the first optical fibers being located at one side of a welding location and the second optical fibers being located on an opposite side of the welding location, a second hold-down element being arranged to come in contact with a top surface only of the second optical fibers.

19. A device for welding optical fibers to each other, the device comprising fiber retaining means, electrodes connected to a high voltage source in order to form an electric arc between the electrodes, a light source for illuminating ends of the optical fibers at a welding location between the electrodes, a light detector receiving light from the light source and the welding location, and further comprising a mirror having a reflecting surface which is directed downwards and deflects light from the light source to the light detector, the light source being placed below a horizontal plane extending through the welding location, the light source being arranged to emit light substantially upwards and the light source being located, so that light emitted from the light source hits the mirror in an angle to the reflecting surface and is deflected by the mirror in an oblique angle to a horizontal plane, the mirror being located above the horizontal plane, wherein the reflecting surface is horizontal, the light detector is arranged below the horizontal plane and the oblique angle is comprised within the interval of 15–75°, preferably within the interval of 30–60°.

20. The device of claim 16 for welding simultaneously a plurality of opposite optical fiber pairs to each other, wherein the fiber retaining means are arranged to retain the fibers to be welded substantially in a horizontal plane.

21. The device of claim 16 further comprising an openable casing for shielding the electric arc and protecting ends of the optical fibers at the welding location, the mirror being attached to an interior side of the openable casing for deflecting light from the light source, so that it hits the ends of the optical fibers, only when the openable casing is in a closed position.

22. The device of claim 16 comprising two sets of a light source, a mirror and a light detector, the two sets being arranged symmetrically in relation to the optical fibers and the welding location, light from the light source in a first set of the two sets passing in a first plane to the mirror and from the mirror to the light detector of the first set and light from the light source in a second set of the two sets passing in a second plane to the mirror and from the mirror to the light detector of the second set, the first plane and the second plane substantially coinciding and substantially perpendicular to ends of the optical fibers at the welding location.

* * * * *